United States Patent
Yanagawa

(10) Patent No.: US 7,355,667 B2
(45) Date of Patent: Apr. 8, 2008

(54) LIQUID CRYSTAL DISPLAY DEVICE AND MANUFACTURING METHOD THEREOF

(75) Inventor: Kazuhiko Yanagawa, Mobara (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 0 days.

(21) Appl. No.: 11/218,503

(22) Filed: Sep. 6, 2005

(65) Prior Publication Data

US 2005/0286006 A1 Dec. 29, 2005

Related U.S. Application Data

(63) Continuation of application No. 10/636,559, filed on Aug. 8, 2003, now Pat. No. 6,956,636.

(30) Foreign Application Priority Data

Sep. 3, 2002 (JP) ............... 2002-257410

(51) Int. Cl.
G02F 1/1339 (2006.01)
(52) U.S. Cl. ..................... 349/153; 349/155
(58) Field of Classification Search ........ 349/153–160, 349/189–190
See application file for complete search history.

(56) References Cited

U.S. PATENT DOCUMENTS

| 5,556,670 | A | * | 9/1996 | Mihara et al. ............... 428/1.5 |
| 5,724,110 | A |   | 3/1998 | Majima |
| 5,777,713 | A |   | 7/1998 | Kimura |
| 6,222,603 | B1 |  | 4/2001 | Sakai et al. |
| 6,705,584 | B2 | * | 3/2004 | Hiroshima et al. ......... 249/155 |
| 6,740,190 | B2 | * | 5/2004 | Takase ...................... 156/267 |
| 6,864,943 | B2 | * | 3/2005 | Hirakata et al. ............ 349/153 |
| 2002/0191141 | A1 | | 12/2002 | Liao |
| 2004/0080703 | A1 | | 4/2004 | Lai |

FOREIGN PATENT DOCUMENTS

| EP | 1 076 257 | 2/2001 |
| JP | 61-241730 | 10/1986 |
| JP | 64-054420 | 3/1989 |
| JP | 05-005890 | 1/1993 |

(Continued)

OTHER PUBLICATIONS

Bouten, Pretrus C., WO 02/095491, World Intellectual Property Organization.*

Primary Examiner—David Nelms
Assistant Examiner—Phu Vu
(74) Attorney, Agent, or Firm—Antonelli, Terry, Stout & Kraus, LLP.

(57) ABSTRACT

A liquid crystal display device include a pair of substrates with liquid crystal material therebetween, a plurality of first spacers formed on one of the pair of substrates, and a second spacer formed on the one of the pair of substrates and arranged to surround the plurality of first spacers in plan view. The first spacer and the second spacer and are made of resin and are not made from the liquid crystal material. Further, a distance from the one of the pair of substrates to a top surface of the first spacers is smaller than a distance from the one of the pair of substrates to a top surface of the second spacer.

14 Claims, 10 Drawing Sheets

FOREIGN PATENT DOCUMENTS

| | | |
|---|---|---|
| JP | 06-138444 | 5/1994 |
| JP | 06-194615 | 7/1994 |
| JP | 8-297286 | 11/1996 |
| JP | 2001-051283 | 2/2001 |
| JP | 2001-66612 | 3/2001 |
| JP | 2001-337335 | 12/2001 |

* cited by examiner

LIQUID CRYSTAL DISPLAY DEVICE AND MANUFACTURING METHOD THEREOF

CROSS REFERENCE TO RELATED APPLICATIONS

This application is a continuation of U.S. application Ser. No. 10/636,559, filed Aug. 8, 2003, now U.S. Pat. No. 6,956,636, the contents of which are incorporated herein by reference.

BACKGROUND OF THE INVENTION

The present invention relates to a liquid crystal display device and a method of manufacturing the same; and, in particular, the invention relates to a liquid crystal display device having a configuration in which a liquid crystal materials maintained by a seal material on one substrate and is enclosed by overlaying another substrate thereon, and a method of manufacture thereof.

A liquid crystal display device is constituted by a pair of substrates provided opposite to each other in spaced relationship with a liquid crystal material interposed therebetween, and electrodes are provided on at least one of the substrates to form a multiplicity of pixels provided in the direction in which the liquid crystal material spreads. The liquid crystal material is enclosed within a space between the substrates by a seal material that also secures one of the substrates to the other substrate.

Referring to the enclosure of the liquid crystal material in such a case, in a typical configuration, the liquid crystal material maintained by the seal material on one of the substrates is enclosed by overlaying the other substrate on the one substrate. Specifically, a configuration is known in which the seal material is formed on one of the substrates; the liquid crystal material is dispensed in an appropriate amount in an area surrounded by the seal material; and the other substrate is thereafter overlaid and secured to the seal material (see JP-A-2001-337335).

A liquid crystal display device having such a configuration makes it possible to provide a liquid crystal display panel with a size greater than that achievable with a method in which a cell is formed with substrates and a seal material, and in which a liquid crystal material is introduced through a liquid crystal sealing port formed in a part of the seal material, for example.

SUMMARY OF THE INVENTION

In the case of a liquid crystal display device having such a configuration, however, it is difficult to control the appropriate amount of the liquid crystal material when it is dispensed, which frequently results in an outflow of a redundant portion of the liquid crystal material beyond the seal material when the other substrate is overlaid thereon.

In this case, the liquid crystal material that has flowed out beyond the seal material is susceptible to contamination for some reason; the contamination spreads also in the liquid crystal material within the seal material; and the contamination that has thus spread can result in the problem of reduction in the display quality.

For example, when a thermosetting material having a high bonding strength is used as the seal material, the liquid crystal material may be contaminated to such a degree that irregularities of luminance can occur when it contacts the seal material that has not set yet. This holds true for a photo-setting seal material.

The invention has been conceived under such circumstances, and it is an object of the present invention to provide a liquid crystal display device in which contamination of the liquid crystal material does not spread, and a method of manufacturing the same.

Typical features of the invention disclosed in the present application will now be briefly described below.

(1) A liquid crystal display device according to the present invention is characterized in that it has a seal material for isolating a liquid crystal material from the outside, which seal material is provided between substrates that are disposed opposite to each other with the liquid crystal material interposed therebetween, the seal material being formed as a portion that encloses the liquid crystal material in a part thereof or an annular pattern having no trace of the same, a first rib-like supporting strut provided inside the seal material and between the substrates to prevent the liquid crystal material from contacting the seal material, and a second rib-like supporting strut that, in combination with the first rib-like supporting strut, forms a passage into which the liquid crystal material flows out from an opening serving as an exit formed in the first rib-like supporting strut.

(2) In a method of manufacturing a liquid crystal display device according to the present invention, a liquid crystal material is dispensed into an area surrounded by a seal material on one substrate on which the seal material is formed and in which another substrate is overlaid in a face-to-face relationship, the method being characterized in that it includes the steps of forming a first rib-like supporting strut inside the seal material on the substrate, the first supporting strut being substantially concentric with the seal material and having an opening in a part thereof, forming a second rib-like supporting strut outside the first rib-like supporting strut, the second supporting strut being formed with a length to sufficiently extend across the opening, and dispensing the liquid crystal material within an area surrounded by the first rib-like supporting strut.

(3) For example, a liquid crystal display device according to the invention is characterized in that it has a seal material for isolating a liquid crystal material from the outside, which seal material is provided between substrates that are disposed opposite to each other with the liquid crystal material interposed therebetween, a rib-like supporting strut provided inside the seal material and between the substrates to prevent the liquid crystal material from contacting the seal material, and strut-like spacers positioned at a multiplicity of pixels formed in an area surrounded by the rib-like supporting strut, wherein the strut-like spacers and the rib-like supporting strut are formed such that the height of the top of the rib-like supporting strut above the top surface of the substrate to which it is secured is greater than the height of the top of the strut-like spacers, and wherein a gap adjusting layer is formed on a liquid crystal side of the other substrate provided opposite to the above-mentioned substrate at least in a region that is opposite to the strut-like spacers.

(4) For example, a liquid crystal display device has first and second substrates with a liquid crystal layer disposed therebetween; seal material formed on the first substrate and enclosing a space between the first substrate and the second substrate; and means to maintain the liquid crystal material within the space in such a way as to avoid contact with the seal material.

(5) For example, a liquid crystal display device has first and second substrates with a liquid crystal layer disposed therebetween; seal material formed on the first substrate and enclosing a space between the first substrate and the second substrate; and means to control the gap between the first substrate and the second substrate by adjusting the area filled with the liquid crystal material.

The invention is not limited to the above-described configurations, and various modifications may be made within the scope of the technical teaching of the invention.

DETAILED DESCRIPTION

Embodiments of a liquid crystal display device according to the present invention will now be described with reference to the drawings.

First Embodiment (General Configuration)

Figure 18A:
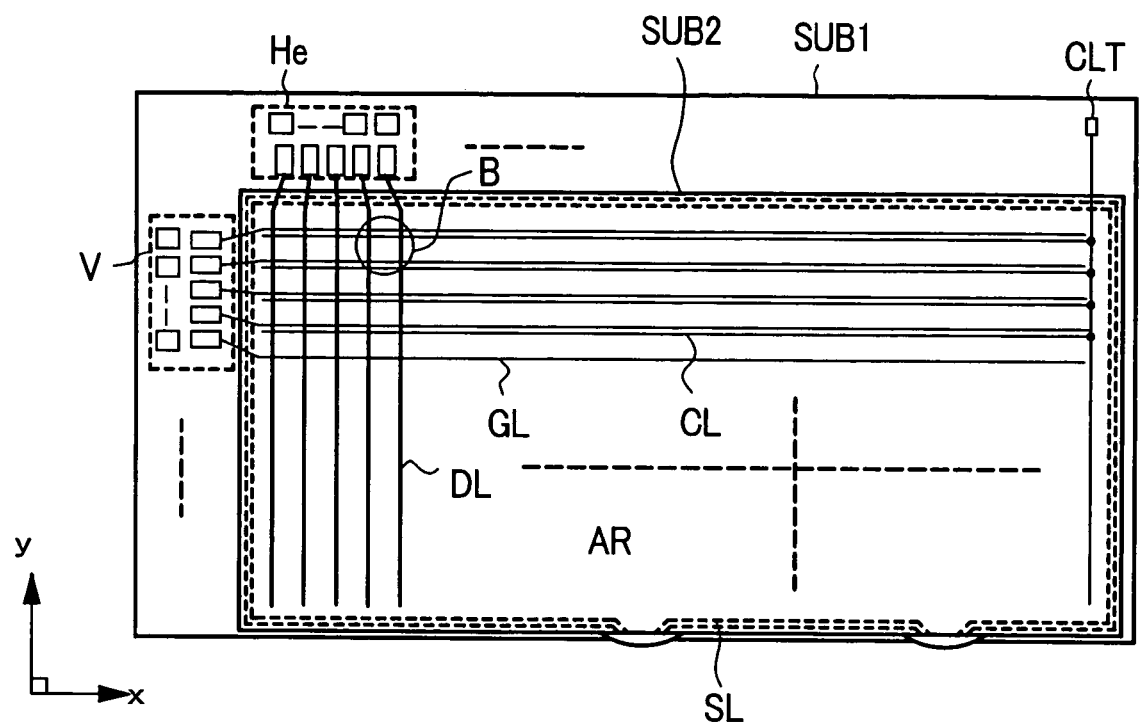
FIG. 18A is a diagrammatic plan view which shows a general configuration of an embodiment of a liquid crystal display device according to the invention.
Figure 18B:
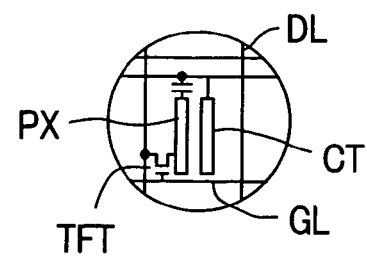
FIG. 18B is an equivalent circuit diagram of a pixel shown in the area B in FIG. 18A.

FIG. 18A is a diagrammatic plan view showing the general configuration of an embodiment of a liquid crystal display device according to the invention. FIG. 18A shows a configuration consisting of an array of pixels in the form of an equivalent circuit diagram. FIG. 18B shows an example of an equivalent circuit of a single pixel.

First, there is a pair of transparent substrates SUB1 and SUB2 that are provided opposite to each other with a liquid crystal material interposed therebetween, and the liquid crystal material is enclosed with a seal material SL that also secures the transparent substrate SUB2 to the other substrate SUB1.

On a surface of the liquid crystal side of the transparent substrate SUB1, the periphery of which is surrounded by the seal material SL, there are gate signal lines GL that extend in an x-direction and are disposed in parallel with each other in a y-direction and drain signal lines DL that extend in the y-direction and are disposed in parallel with each other in the x-direction. A region that is surrounded by adjacent gate signal lines GL and adjacent drain signal lines DL constitutes a pixel region, and a plurality of such pixel regions in the form of a matrix array constitutes a liquid crystal display area AR.

In each of the pixel regions that are in parallel with each other in the x-direction, a common counter voltage signal line CL is formed such that it is routed through the pixel regions. The counter voltage signal lines CL serve as signal lines for supplying a voltage to be used as a reference for a video signal to a counter electrode CT of each pixel region.

Each pixel region is formed with a thin film transistor TFT that is operated by a scan signal received from a gate signal line GL located on one side thereof and a pixel electrode PX to which a video signal is supplied from a drain signal line DL located on one side thereof via the thin film transistor TFT.

An electric field is generated between the pixel electrode PX and the counter electrode CT that is connected to the counter voltage signal line CL, and the light transmittance of the liquid crystal material is controlled by the electric field.

One end of each of the gate signal lines GL is extended beyond the seal material SL, and the extended end constitutes a terminal to which an output terminal of a scan signal driving circuit V is connected. A signal from a printed circuit board (not shown) provided outside the liquid crystal display panel is input to an input terminal of the scan signal driving circuit V. The scan signal driving circuit V is constituted by a plurality of semiconductor devices, and a plurality of gate signal lines GL, which are disposed adjacent to each other, are grouped together, one of the semiconductor devices being allocated to each of such groups.

Similarly, one end of each of the drain signal lines DL is extended beyond the seal material SL, and the extended end constitutes a terminal to which an output terminal of a video signal driving circuit He is connected. A signal from a printed circuit board (not shown) provided outside the liquid crystal display panel is input to an input terminal of the video signal driving circuit He. The video signal driving circuit He is also constituted by a plurality of semiconductor devices, and a plurality of drain signal lines DL, which are disposed adjacent to each other, are grouped together, one of the semiconductor devices being allocated to each of such groups.

The counter voltage signal lines CL are connected together at the right end, as seen in the figure, and the connecting line is extended beyond the seal material SL to form a terminal CLT at the extended end thereof. The voltage to serve as a reference for a video signal is supplied through the terminal CLT.

The gate signal lines GL are sequentially selected one at a time by a scan signal received from the scan signal driving circuit V. A video signal is supplied from the video signal driving circuit He to each of the drain signal lines DL in accordance with the timing at which the gate signal lines GL are selected.

While the scan signal driving circuit V and the video signal driving circuit He in the above-described embodiment are illustrated as semiconductor devices mounted on the transparent substrate SUB1, they may be so-called tape carrier type semiconductor devices that are connected between the transparent substrate SUB1 and the printed circuit boards. Further, when semiconductor layers of the thin film transistors TFT are constituted by polycrystalline silicon (p-Si), the semiconductor devices made of polycrystalline silicon may be formed on a surface of the transparent substrate SUB1 along with a wiring layer.

While the pixel electrode PX and the counter electrode CT of a pixel are provided in parallel with the liquid crystal layer in the above-described embodiment, they may be formed so as to oppose each other in the vertical direction with the liquid crystal material interposed therebetween, i.e., the counter electrode may be formed on the transparent substrate SUB2. In this case, both of the pixel electrode PX and the counter electrode CT are constituted by a translucent conductive film, such as an ITO (indium tin oxide) film, to allow light to pass through the electrodes.

(Configuration of the Seal Material and the Neighborhood)

Figure 1A:
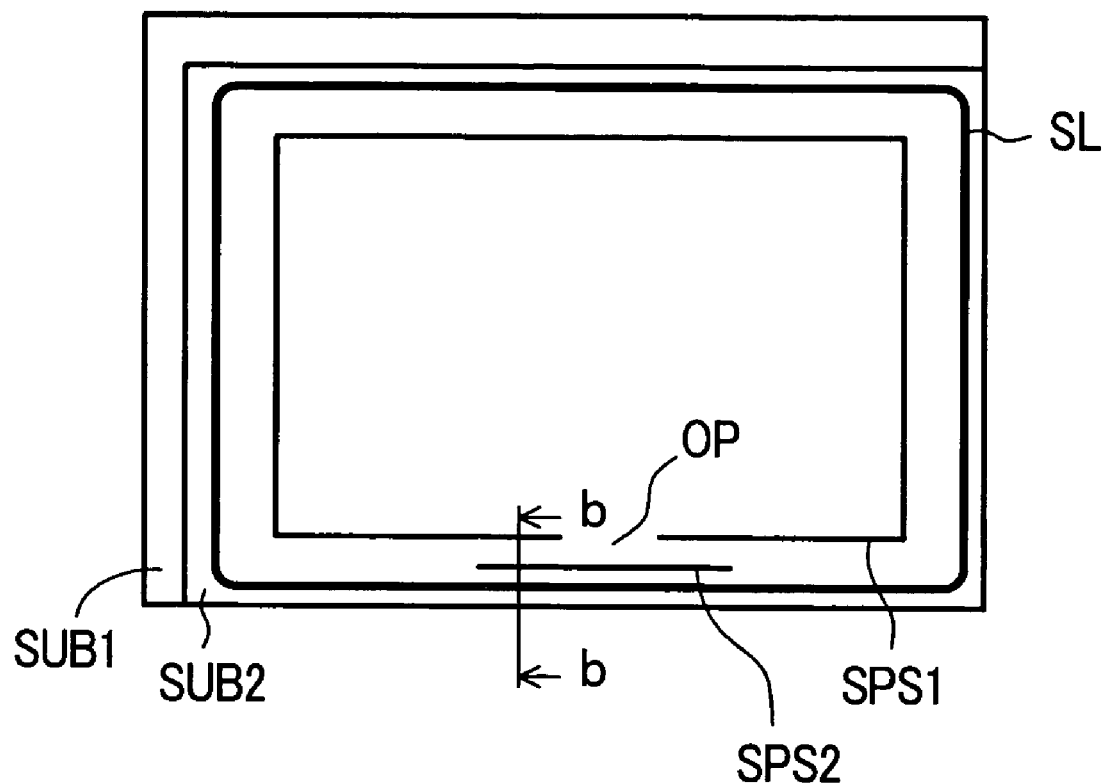
FIG. 1A is a diagrammatic plan view and FIG. 1B is a sectional view taken along line b-b in FIG. 1A, showing an embodiment of a liquid crystal display device according to the invention.
Figure 1B:
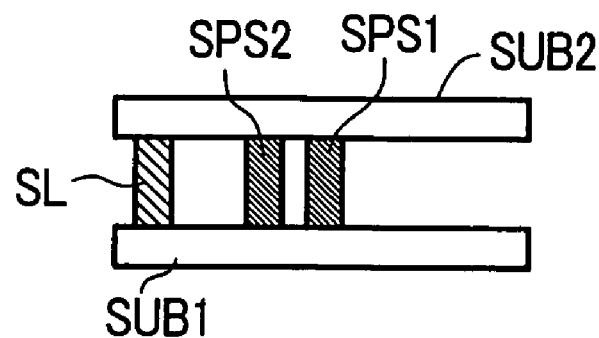

FIG. 1A is a diagram showing the seal material SL and the neighborhood thereof in an embodiment of the present invention. FIG. 1A is a plan view, and FIG. 1B is a sectional view taken along the line b-b in FIG. 1A.

In FIG. 1A, the seal material SL is formed on either of the transparent substrate SUB1 and the transparent substrate SUB2 using a dispenser, for example; the liquid crystal material is dispensed to a region inside the seal material SL; the other substrate is placed on the seal material SL opposite to the first substrate after the liquid crystal material is filled to cover the liquid crystal display area AR sufficiently; and the second substrate is secured to the seal material SL. As a result, the liquid crystal material is sandwiched between the transparent substrate SUB1 and the transparent substrate SUB2 and enclosed with the seal material SL. Thus, the seal material SL is formed as a portion that encloses the liquid crystal material in a part thereof or a pattern having no trace of the same, i.e., a continuous annular pattern.

A first rib-like supporting strut SPS1 is formed inside the seal material SL and between the seal material SL and the liquid crystal display area AR such that it substantially surrounds the liquid crystal display area AR. That is, the first rib-like supporting strut SPS1 is provided with an opening OP in a part thereof and is formed such that it surrounds the liquid crystal display area AR, except at the opening OP.

A second rib-like supporting strut SPS2 is formed on the seal material SL side of the first rib-like supporting strut SPS1 and in the vicinity of the opening OP. The second rib-like supporting strut SPS2 is not only formed in a region opposite to the opening OP of the first rib-like supporting strut SPS1, but it is also formed with a length sufficient to cover, i.e. to extend across, the opening OP.

Therefore, the planar pattern defined by the first rib-like supporting strut SPS1 and the second rib-like supporting strut SPS2 is formed such that an exit (opening OP) is provided in a part of the first rib-like supporting strut SPS1 surrounding the liquid crystal display area AR and such that the exit leads to a passage that extends on the left and right of the same and that is surrounded by walls constituted by the first rib-like supporting strut SPS1 and the second rib-like supporting strut SPS2.

The first rib-like supporting strut SPS1 and the second rib-like supporting strut SPS2 may be formed at the same time when strut-like spacers are formed to maintain a gap between the transparent substrate SUB1 and the transparent substrate SUB2 in the liquid crystal display area AR. As a result, an increase in the number of manufacturing steps is avoided.

In such a case, for example, a layer made of resin is formed throughout either of the substrates (SUB1 or SUB2), and the strut-like spacers, the first rib-like supporting strut SPS1, and the second rib-like supporting strut SPS2 are simultaneously formed through selective etching utilizing a so-called photolithographic technique.

Figure 2:
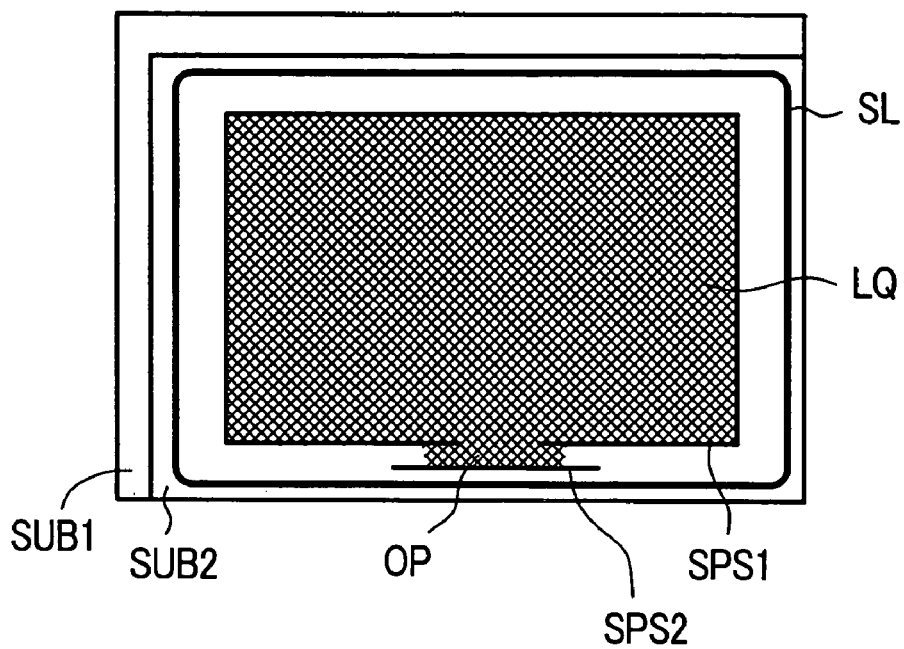
FIG. 2 is a diagrammatic plan view which illustrates an advantage of the liquid crystal display device according to the invention.

In such a configuration, the liquid crystal material LQ is dispensed to the region surrounded by the first rib-like supporting strut SPS1, as shown in FIG. 2, to fill the region with the liquid crystal material such that the liquid crystal display area AR is sufficiently covered. That is, the liquid crystal material can be dispensed without any direct contact occurring between the liquid crystal material and the seal material SL.

In this case, the liquid crystal material may be dispensed in excess, such that a redundant portion of the liquid crystal material flows from the exit (opening OP) formed in the first rib-like supporting strut SPS1 into the passage that extends on the left and right of the exit and that is surrounded by walls constituted by the first rib-like supporting strut SPS1 and the second rib-like supporting strut SPS2, the liquid crystal being maintainable in that passage. It is therefore possible to avoid direct contact between the liquid crystal material and the seal material SL also in this case.

Since the liquid crystal material will not directly contact contaminants included on the seal material SL, the liquid crystal material can be always kept free from any contaminant. This makes it possible to prevent the occurrence of irregularities of luminance attributable to such contaminants.

In a sense, the region where the liquid crystal material resides is automatically optimized by the amount of the liquid crystal itself. This makes it possible to maintain the gap with stability.

Even when the liquid crystal panel is pressed from the outside to an extent that a change in the gap results, the redundant portion of the liquid crystal automatically adjusts the amount of the liquid crystal in each region to an optimum value in accordance with changes in regions where the liquid crystal exists.

Thus, the seal material SL still functions as a seal material in that it isolates the liquid crystal from the outside, although the previous function of directly enclosing the liquid crystal material according to the related art is eliminated.

A liquid crystal display device having such a configuration can be always kept free from any contaminant because the liquid crystal material therein does not contact contaminants included on the seal material SL. This makes it possible to prevent the occurrence of irregularities in luminance attributable to the contaminants.

Such a configuration is advantageous also in that it is possible to suppress variations of the gap at the liquid crystal layer attributable to temperature changes. Specifically, it is known that a gap change of 0.1 μm can be caused by a cubical expansion of the liquid crystal material attributable to a temperature change from room temperature to an elevated temperature (in the range from 20° C. to 60° C.). In this case, since the liquid crystal material flows in the passage from the exit (opening OP) in the first rib-like supporting strut SPS1 in an amount corresponding to such expansion, it is possible to prevent the occurrence of the gap change.

Figure 3:
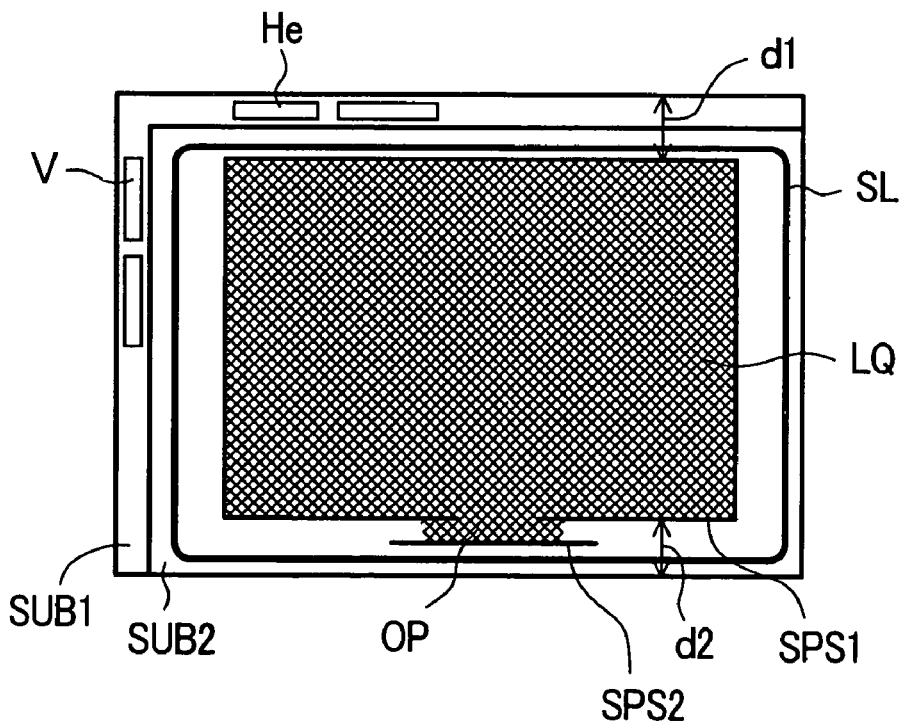
FIG. 3 is a diagrammatic plan view of another embodiment of a liquid crystal display device according to the invention.

As shown in FIG. 3, the first rib-like supporting strut SPS1 may be provided such that it is close to the seal material SL on the side where the video signal driving circuit He is provided and further from the seal material SL on the opposite side where the video signal driving circuit He is not provided.

One reason for this is that the liquid crystal display area AR surrounded by the first rib-like supporting strut SPS1 can be located in the middle of the transparent substrate SUB1 relative to the outer frame of the liquid crystal panel or the periphery of the transparent substrate SUB1 in the present embodiment. In other words, as seen in FIG. 3, the distance d1 from the peripheral edge of the transparent substrate SUB1, where the video signal driving circuit He is provided, to the seal material SL can be set to be substantially equal to the distance d2 from the other peripheral edge, opposite to the peripheral edge of the transparent substrate SUB1 where the video signal driving circuit He is provided, to the seal material SL. Another reason for this arrangement is that the second rib-like supporting strut SPS2 can be formed in a relatively large space on the opposite side where the video signal driving circuit He is not provided.

Preferably, the passage that extends on the left and right of the exit (opening OP) formed in the first rib-like supporting strut SPS1 and that is surrounded by walls constituted by the first rib-like supporting strut SPS1 and the second rib-like supporting strut SPS2 has a sufficiently great length. In order to suppress the spread of contamination of the liquid crystal material, it must be formed with a length greater than the width between the first rib-like supporting strut SPS1 and the seal material SL on the side where the scan signal driving circuit V is provided. Therefore, such a configuration may be employed.

(Method of Enclosing the Liquid Crystal)

FIGS. 4A to 4D are diagrams which constitute a flow chart showing an embodiment of a method of enclosing a liquid crystal material between either of the substrates (e.g., the transparent substrate SUB2) formed with a first rib-like supporting strut SPS1 and a second rib-like supporting strut SPS2 and the other substrate (e.g., the transparent substrate SUB1) provided opposite to that substrate, as described above.

Figure 4A:
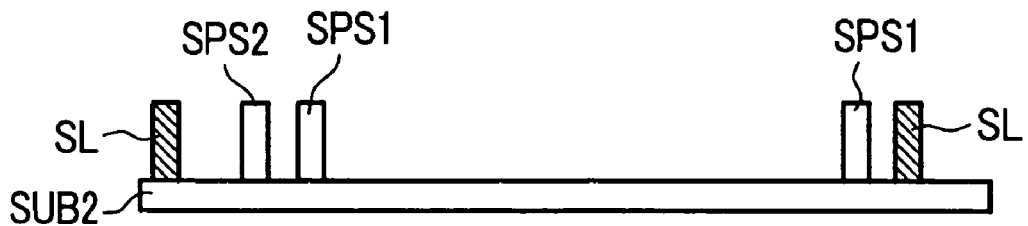
FIGS. 4A to 4D are diagrams which constitute a flow chart showing an embodiment of a method of manufacturing a liquid crystal display device according to the invention.

Step 1 (FIG. 4A)

The transparent substrate SUB2 is prepared, the substrate having already been formed with the first rib-like supporting strut SPS1 and the second rib-like supporting strut SPS2, and the seal material SL.

Figure 4B:
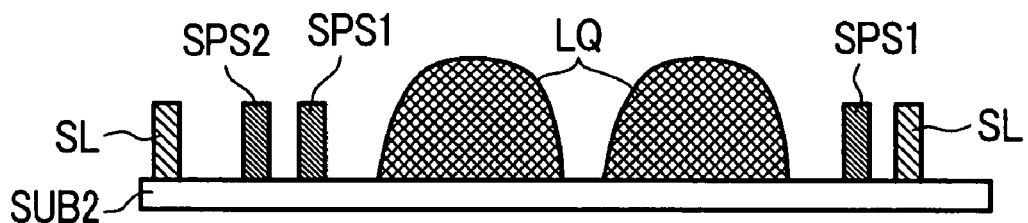

Step 2 (FIG. 4B)

A liquid crystal material LQ is dispensed to an area surrounded by the first rib-like supporting strut SPS1, i.e., a liquid crystal display area AR.

Figure 4C:
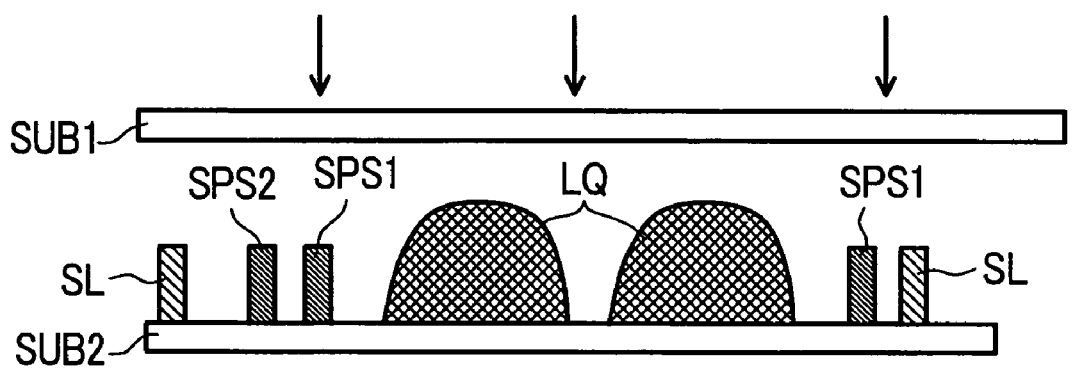

Step 3 (FIG. 4C)

The transparent substrate SUB2 is combined with the transparent substrate SUB1 in a face-to-face relationship in a low pressure or vacuum state.

Figure 4D:
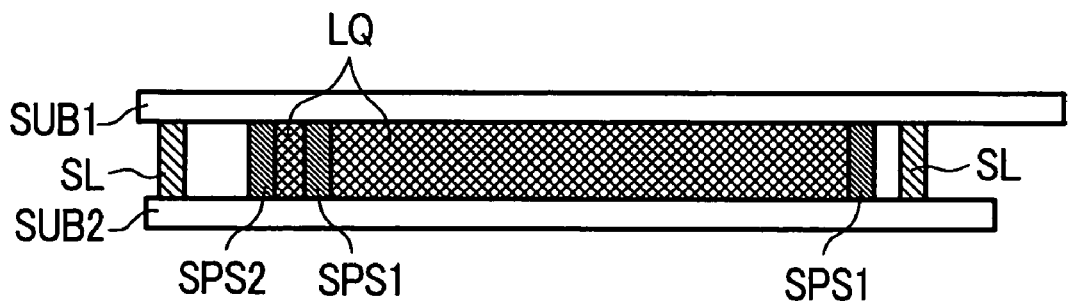

Step 4 (FIG. 4D)

The transparent SUB1 and the seal material SL are secured together.

Second Embodiment

Figure 5:
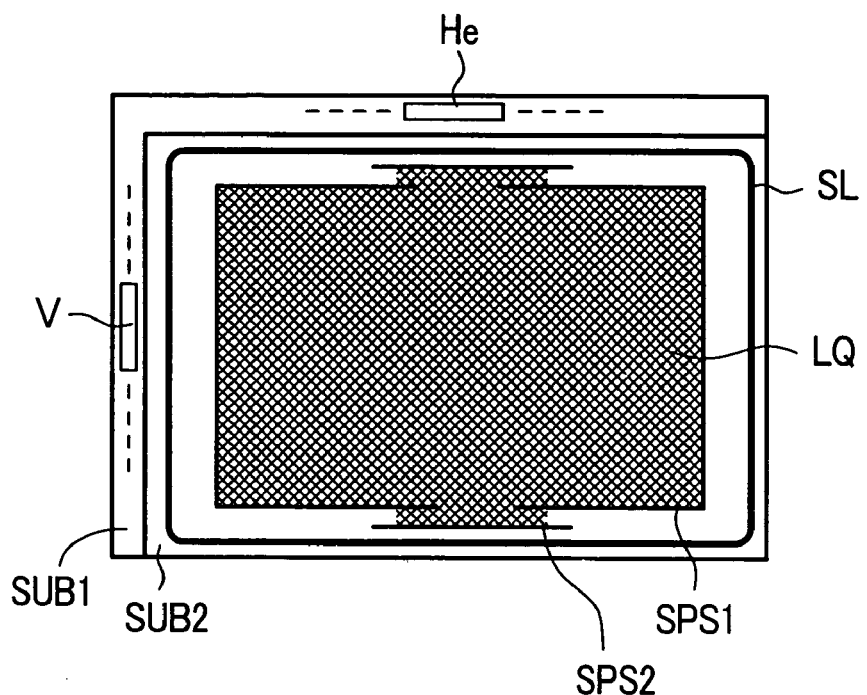
FIG. 5 is a diagrammatic plan view of another embodiment of a liquid crystal display device according to the invention.

FIG. 5 is a plan view of another embodiment of a liquid crystal display device according to the invention.

The configuration of this embodiment is different from that of FIG. 3 in that an exit (opening OP) formed in the first rib-like supporting strut SPS1 and a passage extending on the left and right of the exit and surrounded by walls constituted by the first rib-like supporting strut SPS1 and the second rib-like supporting strut SPS2 are formed also on a side where a video signal driving circuit He is provided.

As a result, when the liquid crystal material is dispensed, a redundant portion of the liquid crystal material can be sufficiently accommodated.

Third Embodiment

Figure 6:
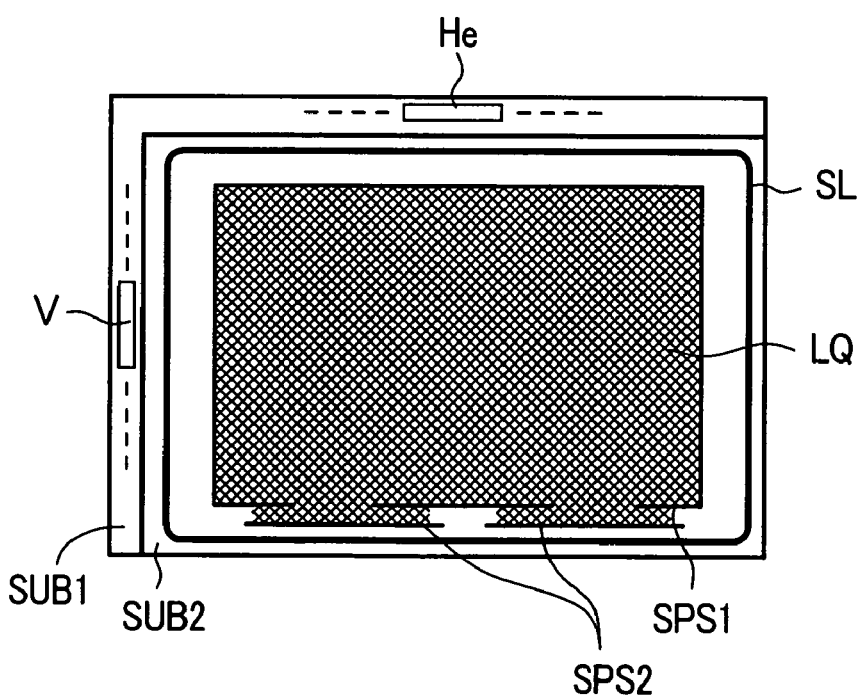
FIG. 6 is a diagrammatic plan view of another embodiment of a liquid crystal display device according to the invention.

FIG. 6 is a plan view of another embodiment of a liquid crystal display device according to the invention.

The configuration of this embodiment is different from that of FIG. 3 in that a plurality of (two in the figure) exits (openings OP) formed in the first rib-like supporting strut SPS1 and a plurality of (two in the figure) passages extending on the left and right of the exits and surrounded by walls constituted by the first rib-like supporting strut SPS1 and second rib-like supporting struts SPS2 are formed side by side on the side opposite to the side where a video signal driving circuit He is provided, for example.

It is obvious that such a configuration also makes it possible to accommodate a redundant portion of the liquid crystal material sufficiently when the liquid crystal material is dispensed.

Fourth Embodiment

Figure 7:
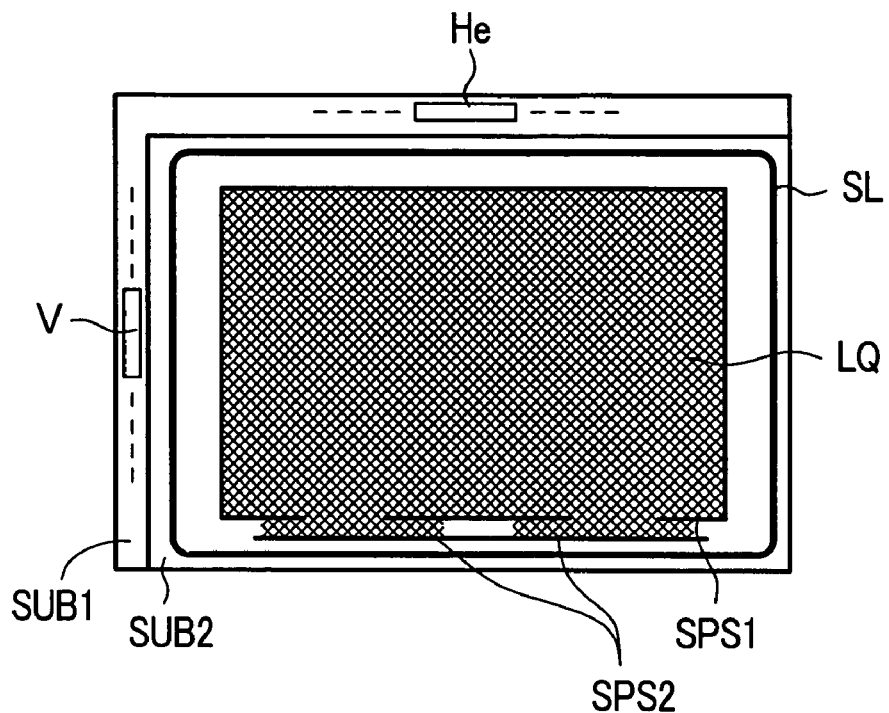
FIG. 7 is a diagrammatic plan view of another embodiment of a liquid crystal display device according to the invention.

FIG. 7 is a plan view of another embodiment of a liquid crystal display device according to the invention and is an embodiment similar to that of FIG. 6.

FIG. 7 is similar to FIG. 6 in that a plurality of (two in the figure) exits (openings OP) formed in a first rib-like supporting strut SPS1 and a plurality of (two in the figure) passages extending on the left and right of the exits and surrounded by walls constituted by the first rib-like supporting strut SPS1 and second rib-like supporting struts SPS2 are formed side by side on the side opposite to the side where a video signal driving circuit He is provided. The main difference in the two embodiments lies in the fact that the second rib-like supporting struts SPS2 of FIG. 6 are combined and formed continuously as a single strut in the embodiment of FIG. 7.

In such a configuration, the adjusting effect can be enhanced because a depressurized (vacuum) region is formed in the passages between the portions of the liquid crystal material that flow out from the respective exits.

Fifth Embodiment

Figure 8:
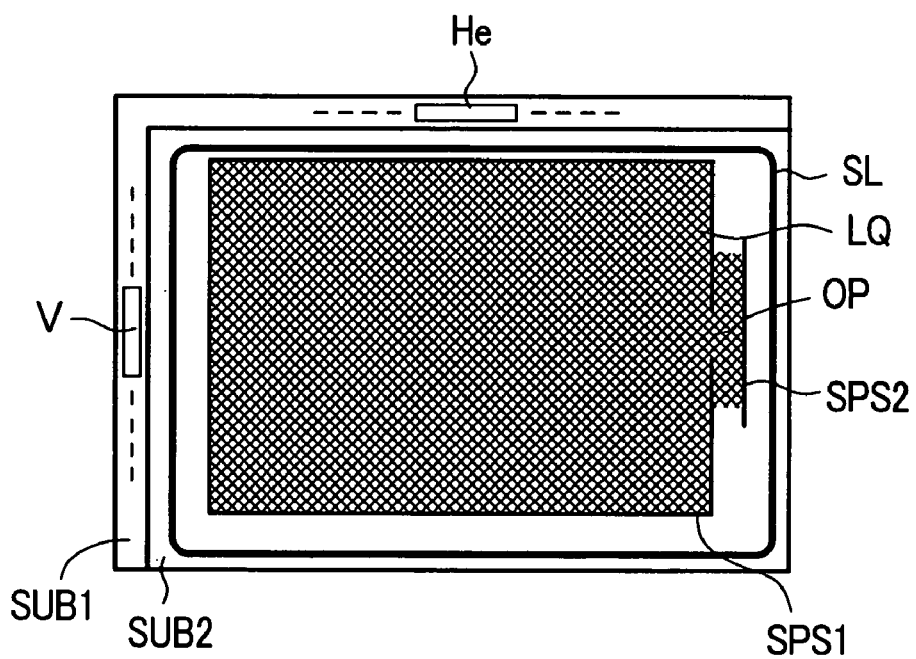
FIG. 8 is a diagrammatic plan view of another embodiment of a liquid crystal display device according to the invention.

FIG. 8 is a plan view of another embodiment of a liquid crystal display device according to the invention.

The configuration of this embodiment is different from that of FIG. 3 in that the exit (opening OP) formed in the first rib-like supporting strut SPS1 and the passage extending on the left and right of the exit and surrounded by walls constituted by the first rib-like supporting strut SPS1 and a second rib-like supporting strut SPS2 are formed on the side opposite to the side where the scan signal driving circuit V is provided.

In this case, either of the first rib-like supporting struts SPS1 may be formed close to the seal material SL and the other strut may be formed further from the seal material SL in order to position the liquid crystal display area AR (an area surrounded by the first rib-like supporting strut SPS1) substantially in the middle of the outer frame of the liquid crystal panel or a transparent substrate SUB1 in a direction across the scan signal driving circuit V (x-direction).

Sixth Embodiment

Figure 9:
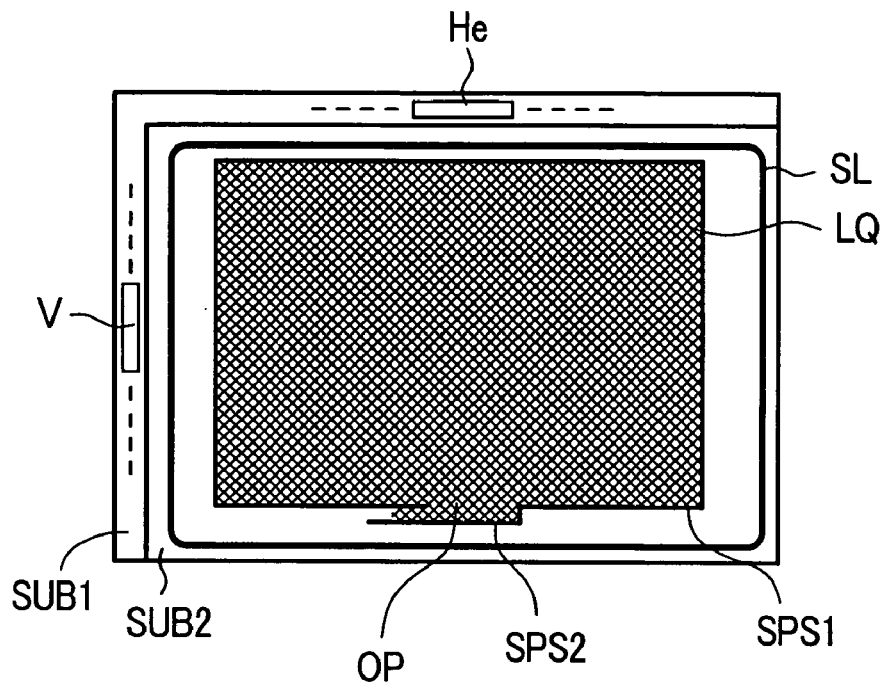
FIG. 9 is a diagrammatic plan view of another embodiment of a liquid crystal display device according to the invention.

FIG. 9 is a plan view of another embodiment of a liquid crystal display device according to the invention.

The configuration of this embodiment is different from that of FIG. 3 in that a passage from an exit (opening OP) formed in the first rib-like supporting strut SPS1, that is surrounded by walls constituted by the first rib-like supporting strut SPS1 and a second rib-like supporting strut SPS2, extends only in one direction.

Specifically, the first rib-like supporting strut SPS1 and the second rib-like supporting strut SPS2 have portions that are connected to each other, and the passage extending in one direction from the exit is defined by unconnected portions of the struts.

Seventh Embodiment

Figure 10:
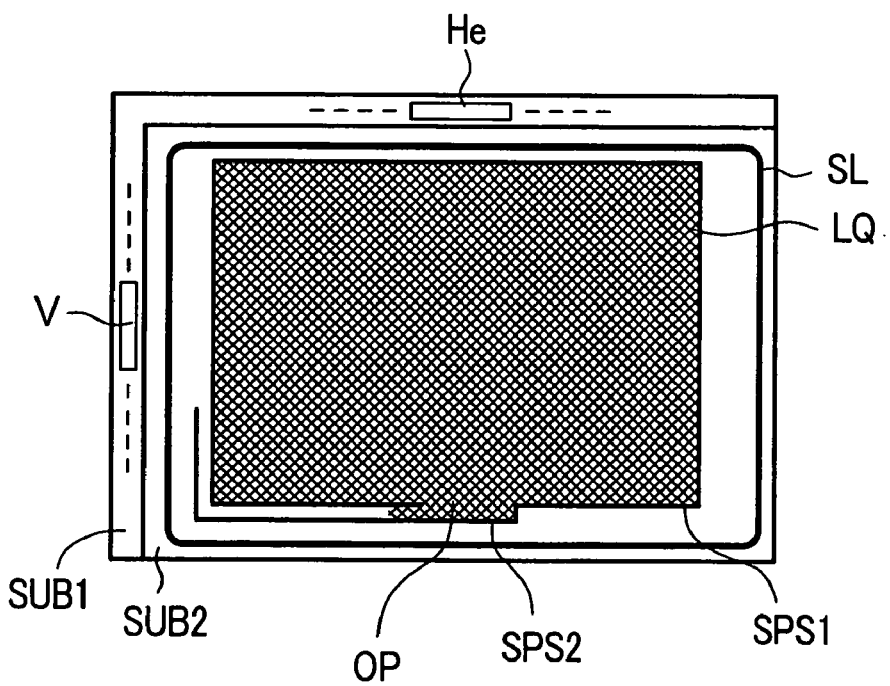
FIG. 10 is a diagrammatic plan view of another embodiment of a liquid crystal display device according to the invention.

FIG. 10 is a plan view of another embodiment of a liquid crystal display device according to the invention and is an embodiment similar to that of FIG. 9.

The configuration of this embodiment is different from that of FIG. 9 in that the passage extending in one direction from an exit (opening OP) formed in the first rib-like supporting strut SPS1 is extended also to the side that faces a scan signal driving circuit V by extending the second rib-like supporting strut SPS2. In other words, the passage extending in one direction is formed such that it passes around a corner of the first rib-like supporting strut SPS1.

Obviously, this makes it possible to provide a passage having a great length so as to be able to accommodate a greater amount of redundant liquid crystal material sufficiently when the liquid crystal material is dispensed.

Eighth Embodiment

Figure 11A:
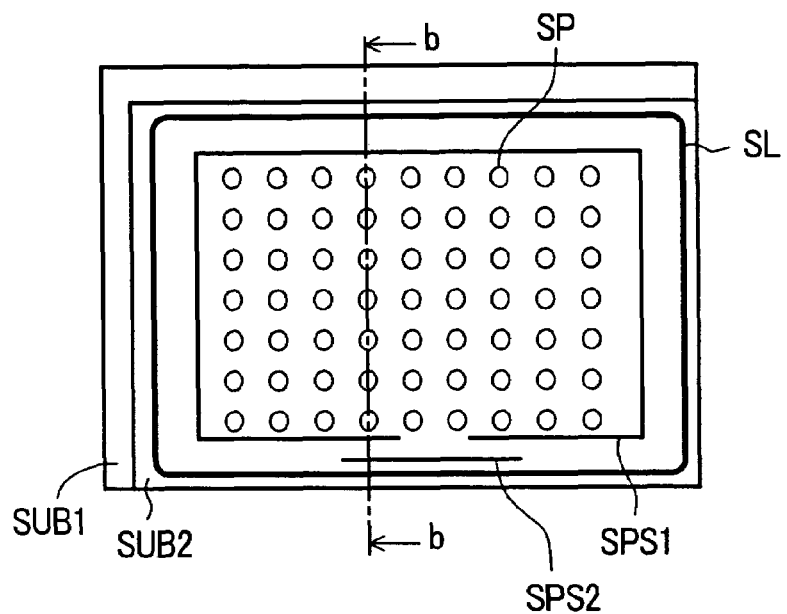
FIG. 11A is a diagrammatic plan view and FIG. 11B is a sectional view taken along line b-b in FIG. 11A, showing another embodiment of a liquid crystal display device according to the invention.
Figure 11B:
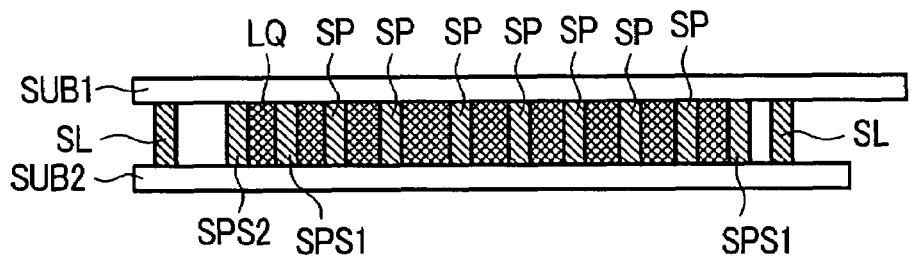

FIG. 11A is a plan view of another embodiment of a liquid crystal display device according to the invention, and FIG. 11B is a sectional view taken along the line b-b in FIG. 11A.

FIGS. 11A and 11B show a case in which the first rib-like supporting strut SPS1 and second rib-like supporting strut SPS2 are formed simultaneously with strut-like spacers SP that are dispersed in a liquid crystal display area AR.

The strut-like spacers SP are provided to maintain a gap between a transparent substrate SUB1 and a transparent substrate SUB2, so that the spacing therebetween is uniform, in order to make the thickness of a liquid crystal layer uniform.

All of the strut-like spacers, the first rib-like supporting strut SPS1, and the second rib-like supporting strut SPS2 may be made of a material such as resin and may be formed simultaneously by selectively etching a resin layer formed throughout a surface of either substrate on a liquid crystal side thereof using a photolithographic technique.

Ninth Embodiment

Figure 12:
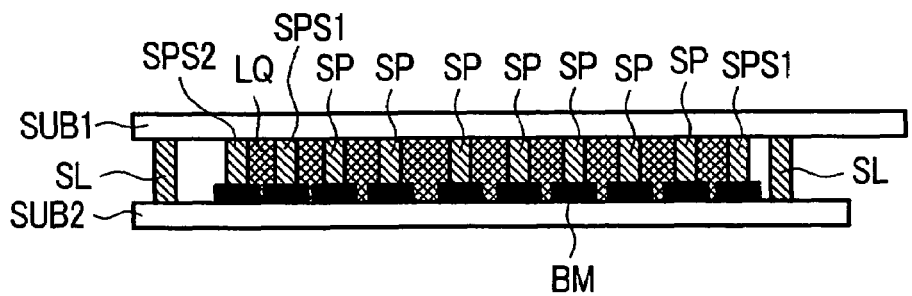
FIG. 12 is a sectional view of another embodiment of a liquid crystal display device according to the invention.

FIG. 12 is a sectional view which shows another embodiment of a liquid crystal display device according to the invention.

The configuration of this embodiment is different from that shown in FIG. 11B in that a black matrix BM is formed on a surface of a transparent substrate SUB2 on the liquid crystal side thereof, for example; the black matrix BM is formed such that it extends outward when strut-like spacers, as described above, are formed above the black matrix BM; and a first rib-like supporting strut SPS1 and a second rib-like supporting strut SPS2 are formed in the extended portion.

The heights of the tops of the first rib-like supporting strut SPS1, the second rib-like supporting strut SPS2, and the strut-like spacers from the top surface of the transparent substrate SUB2 are made equal in order to ensure tight contact between the tops of these members and the transparent substrate SUB1.

Tenth Embodiment

Figure 13:
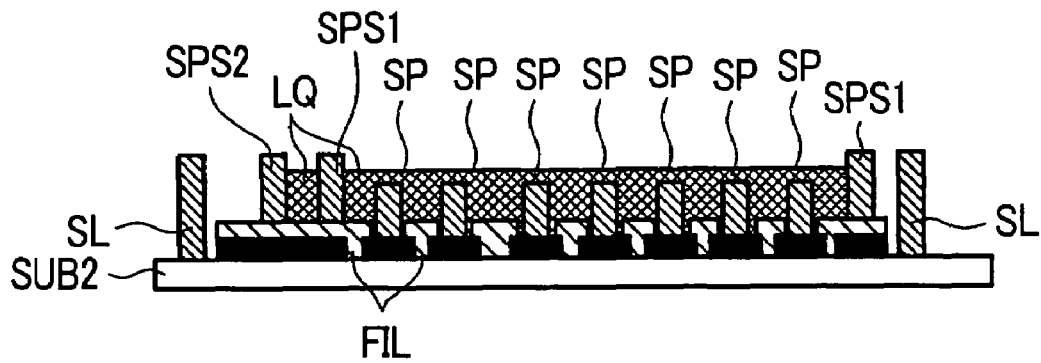
FIG. 13 is a sectional view of another embodiment of a liquid crystal display device according to the invention.

FIG. 13 is a sectional view which shows another embodiment of a liquid crystal display device according to the invention. FIG. 13 shows a state in which a transparent substrate SUB1 has not been overlaid yet.

The configuration of this embodiment is different from that shown in FIG. 12 in that a first rib-like supporting strut SPS1 and a second rib-like supporting strut SPS2 are formed such that the height of the top of each strut from the top surface of a transparent substrate SUB2 is greater than the height of the top of each strut-like spacer SP from the top surface of the transparent substrate SUB2.

In this case, the above-described configuration may be provided by forming a certain layer (e.g., a color filter FIL) under the regions where the first rib-like supporting strut SPS1 and the second rib-like supporting strut SPS2 are formed, while forming no such layer under the region where the strut-like spacers are formed.

Figure 14:
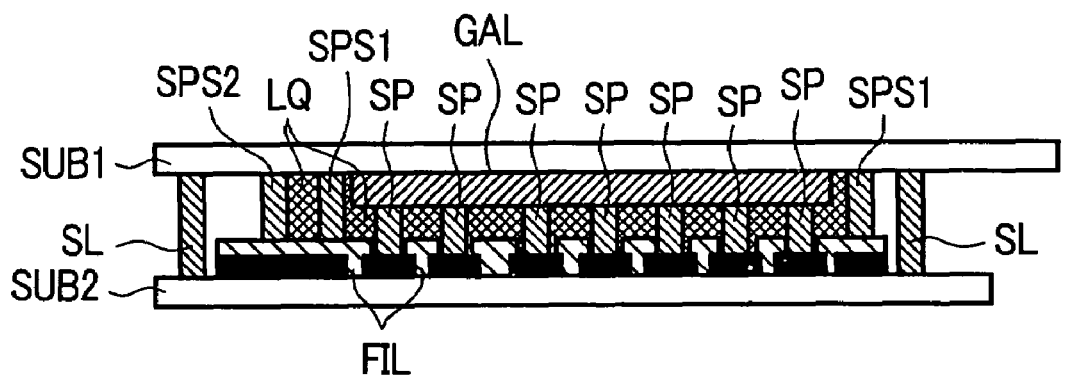
FIG. 14 is a sectional view of another embodiment of a liquid crystal display device according to the invention.

As shown in FIG. 14, any difference between the height of the tops of the first rib-like supporting strut SPS1 and the second rib-like supporting strut SPS2 from the top surface of the transparent substrate SUB2 and the height of the tops of the strut-like spacers from the top surface of the transparent substrate SUB2 is compensated by providing a gap adjusting layer GAL on the surface of the transparent substrate SUB1 facing the strut-like spacers SP.

In such a configuration, when liquid crystal material is dispensed on the surface of the transparent substrate SUB2, since it tends to spread with the liquid level maintained on the same horizontal plane, the dispensing of the liquid crystal material can be completed with the liquid level kept lower than the height of the first rib-like supporting strut SPS1 and the second rib-like supporting strut SPS2. When the transparent substrate SUB1 is overlaid in a face-to-face relationship in this state, a redundant portion of the liquid crystal material can be led to an exit (opening OP) of the first rib-like supporting strut SPS1 and introduced into a passage. This makes it possible to avoid direct contact between the redundant liquid crystal material and the seal material SL with reliability.

The effect of height adjustment in the present embodiment is not limited to the case in which the struts SPS1 and SPS2 are continuous supporting struts. It also works in a case in which the struts SPS1 and SPS2 are provided discretely.

The same effect can be achieved by providing an overcoat layer OC on the filter FIL, instead of the filter FIL, and shaping the overcoat layer OC similarly to the filter FIL of FIG. 13.

Figure 15:
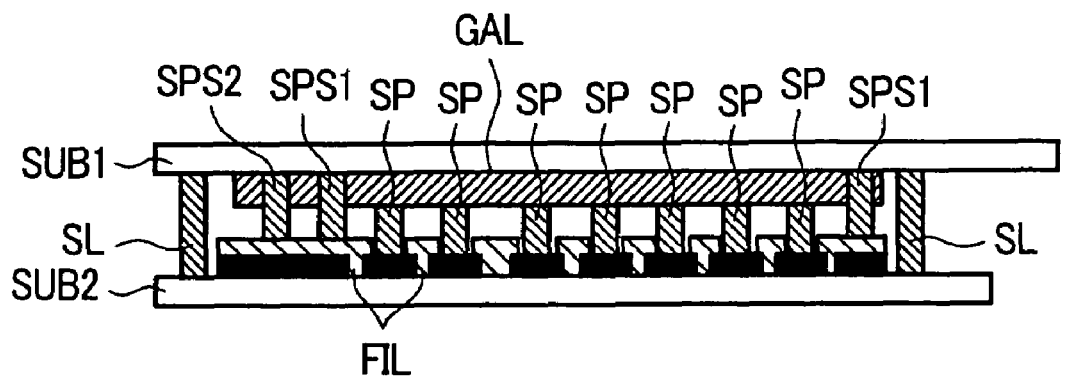
FIG. 15 is a sectional view of another embodiment of a liquid crystal display device according to the invention.

FIG. 15 shows the configuration of another embodiment of a transparent substrate SUB1. In this configuration, a gap adjusting layer GAL is formed on a liquid crystal side of the substrate such that it extends even in a region where a second rib-like supporting strut SPS2 is formed, and the layer has openings at the locations of the first rib-like supporting strut SPS1 and the second rib-like supporting strut SPS2.

Eleventh Embodiment

Figure 16:
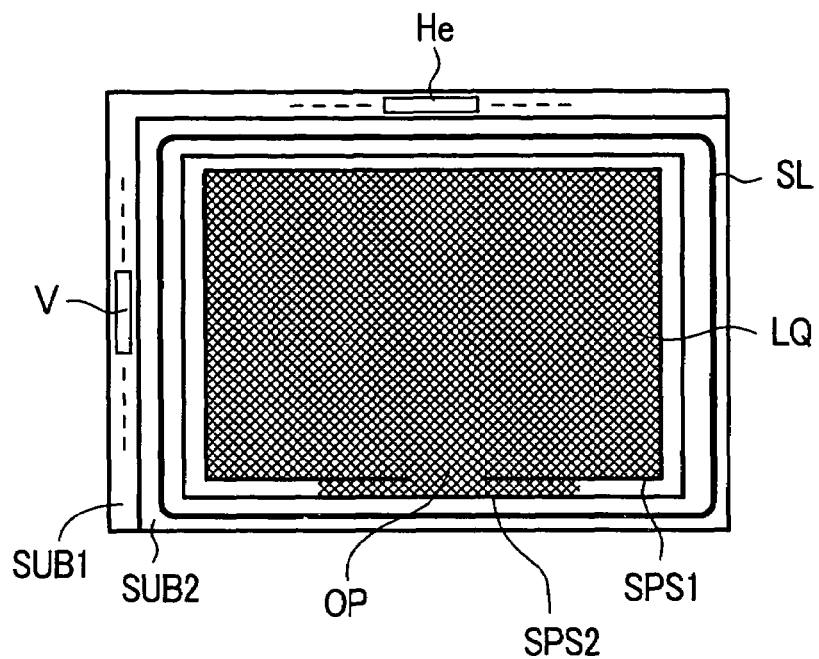
FIG. 16 is a diagrammatic plan view of another embodiment of a liquid crystal display device according to the invention.

FIG. 16 shows the configuration of another embodiment of a liquid crystal display device according to the invention.

The configuration of this embodiment is different from that shown in FIG. 3 in that both ends of a second rib-like supporting strut SPS2 are extended so as to surround the first rib-like supporting strut SPS1 completely. In such a configuration, the passage from an exit (opening OP) of the first rib-like supporting strut SPS1 can be made significantly large, which also makes it possible to accommodate a great amount of redundant liquid crystal material sufficiently when the liquid crystal material is dispensed.

Twelfth Embodiment

Figure 17:
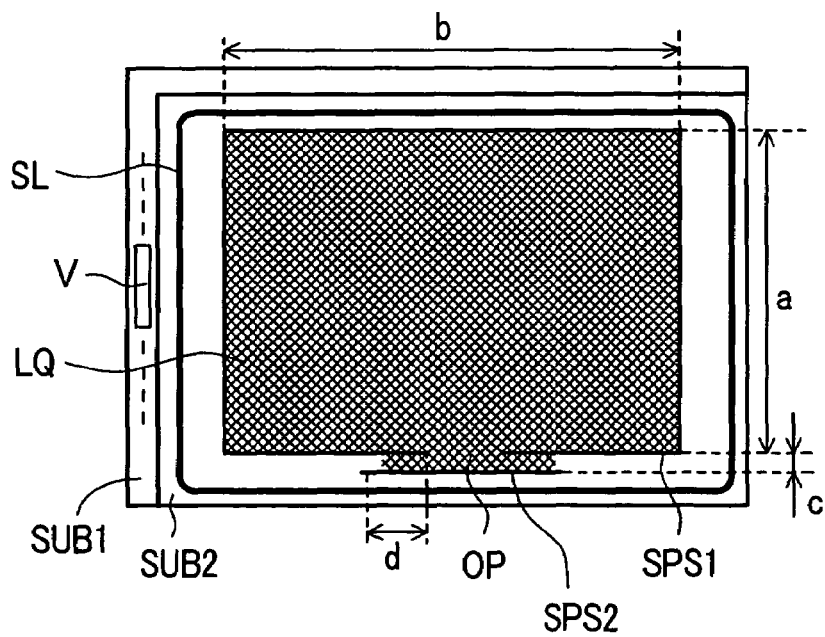
FIG. 17 is a diagrammatic plan view of another embodiment of a liquid crystal display device according to the invention.

FIG. 17 shows the configuration of another embodiment of a liquid crystal display device according to the invention.

In particular, FIG. 17 shows a setting of dimensions of a first rib-like supporting strut SPS1 and a second continuous pillar-like supporting strut SPS2.

It has been experimentally confirmed that a setting expressed by d>10c is preferable, where the first rib-like supporting strut SPS1 has an area of a×b, and where c and d (in the one side of a passage) respectively represent the width and length of a passage that is formed by walls constituted by the second rib-like supporting strut SPS2 and the first rib-like supporting strut SPS1 on the left and right of an exit (opening OP) of the first strut.

Therefore, when the passage is formed on only one side of the exit (opening OP) of the first rib-like supporting strut SPS1, as shown in FIG. 9, it is preferable to set a relationship expressed by d>20c between the width c and the length d of the passage.

Each of the above-described embodiments may be used along or in combination with one another. The purpose is to allow the advantages of each embodiment to be achieved along or in combination with the others.

In the above embodiments, it is preferable to use a thermosetting seal material as the seal material SL. One reason for this is that a thermosetting seal material has a high bonding strength and is therefore suitable for the formation of a large panel. Another reason is that contamination of the liquid crystal material attributable to such a sealing material can be prevented according to the present invention.

As apparent from the above description, the invention makes it possible to provide a liquid crystal display device in which the spread of contamination to the liquid crystal material is prevented.

What is claimed:

1. A liquid crystal display device comprising:
   a pair of rectangular shaped substrates with liquid crystal material therebetween;
   a plurality of first spacers formed on one of the pair of substrates;
   a second spacer formed on the one of the pair of substrates, and arranged to surround the plurality of first spacers in plane view;
   a seal material formed between the pair of substrates, and arranged to surround the second spacer in plane view, the seal material being continuously formed along each side of all sides of the rectangular shaped substrates so that the seal material along one side connects with the seal material along an adjacent side;
   wherein the first spacers and the second spacer are made of resin;
   wherein a distance from the one of the pair of substrates to a top surface of the first spacers is smaller than a distance from the one of the pair of substrates to a top surface of the second spacer; and
   wherein another of the pair of substrates has a gap adjusting layer so as to compensate for a gap resulting from a difference in the distance between the first spacers and the second spacer with respect to the one of the pair of substrates.

2. A liquid crystal display device according to claim 1, wherein the first spacers and the second spacer have substantially the same thickness in a direction substantially parallel to a plane of the one of the pair of substrates.

3. A liquid crystal display device according to claim 1, wherein the gap adjusting layer is arranged at a portion corresponding to the plurality of first spacers.

4. A liquid crystal display device according to claim 1, further comprising a third spacer formed on the one of the pair of substrates, wherein the second spacer is arranged between the plurality of the first spacers and the third spacer in plane view, and a length of the third spacer is longer than a length of the first spacer in plane view.

5. A liquid crystal display device according to claim 4, wherein the first spacers, the second spacer and the third spacer have substantially the same thickness in a direction substantially parallel to a plane of the one of the pair of substrates.

6. A liquid crystal display device according to claim 5, wherein the gap adjusting layer is arranged at a portion corresponding to the plurality of first spacers.

7. A manufacturing method of liquid crystal display device including the steps of:
   forming a plurality of first spacers, a second spacer and a seal material on one substrate having a rectangular shape;
   forming a liquid crystal layer on the one substrate;
   combining another substrate with the one substrate;
   wherein the second spacer is arranged to surround the plurality of first spacers in plane view;
   wherein the seal material is arranged to surround the second spacer in plane view, the seal material being continuously formed along each side of all sides of the one rectangular shared substrate so that the seal material alone one side connects with the seal material along an adiacent side;

wherein a distance from the one substrate to a top surface of the first spacers is smaller than a distance from the one substrate to a top surface of the second spacer; and wherein another of the pair of substrates has a gap adjusting layer so as to compensate for a gap resulting from a difference in the distance between the first spacers and the second spacer with respect to the one of the pair of substrates.

8. A manufacturing method accordance to claim 7, wherein the first spacers and the second spacer are formed at substantially the same time.

9. A manufacturing method according to claim 8, wherein the gap adjusting layer is arranged at a portion corresponding to the plurality of first spacers.

10. A method according to claim 7, further comprising the step of forming a third spacer on the one substrate, wherein the second spacer is arranged between the plurality of first spacers and the third spacer in plane view, and a length of the third spacer is longer than a length of the first spacer in plane view.

11. A manufacturing method according to claim 10, wherein the first spacers the second spacer and the third spacer have substantially the same thickness in a direction substantially parallel to a plane view of the one substrate.

12. A manufacturing method according to claim 11, wherein the gap adjusting layer is arranged at a portion corresponding to the plurality of first spacers.

13. A liquid crystal display device according to claim 1, wherein the seal material enables sealing of the one of the pair of substrates to the another of the pair of substrates and enclosing of the liquid crystal material between the pair of substrates.

14. A manufacturing method according to claim 7, wherein the seal material enables sealing of the one substrate to the another substrate and enclosing of the liquid crystal layer between the one substrate and the another substrate.

* * * * *